Jan. 31, 1961 H. C. LUTZ 2,969,885
CARRIERS OR TRAILERS
Filed Dec. 11, 1957 2 Sheets-Sheet 1
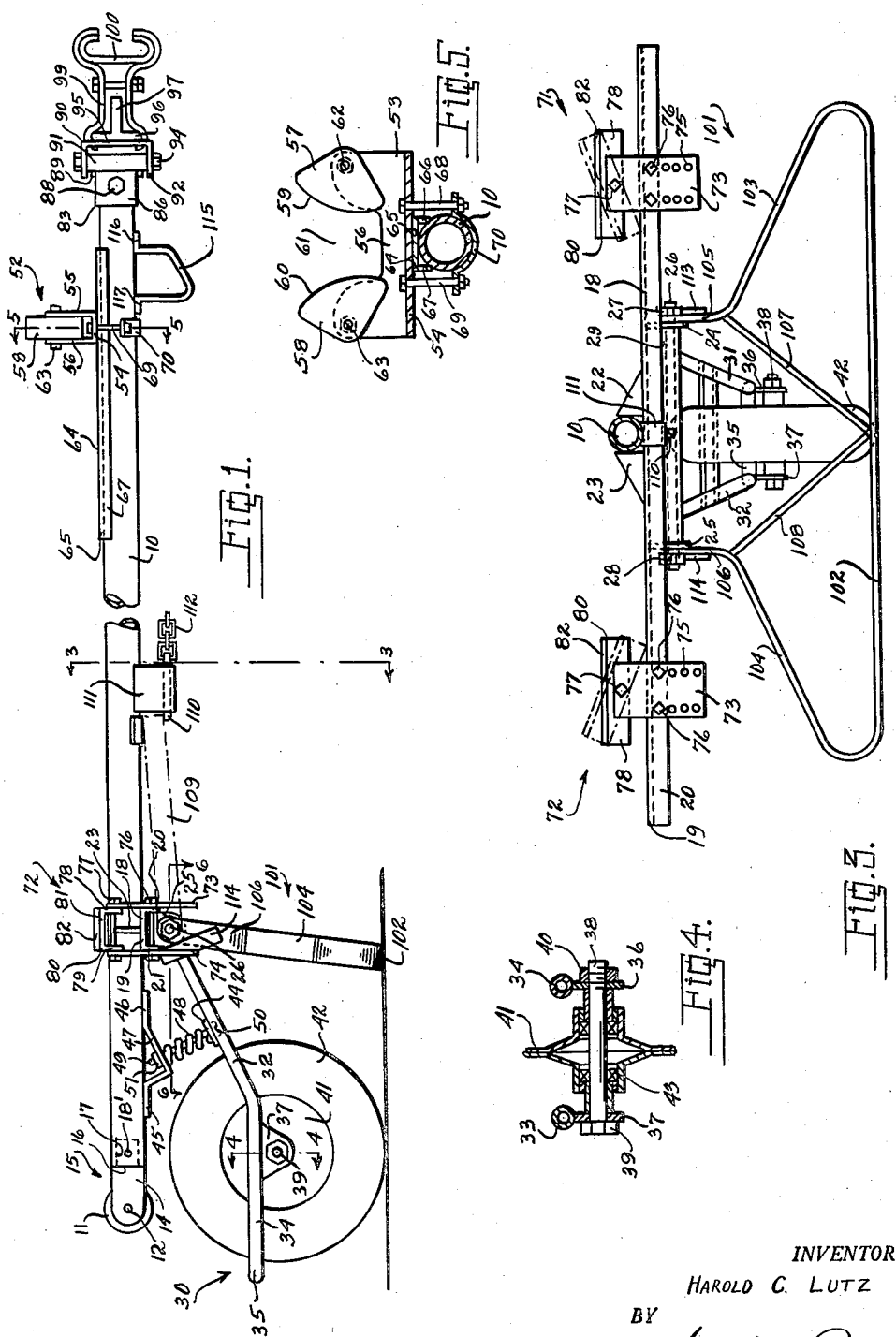
INVENTOR.
HAROLD C. LUTZ
BY
Joseph A. Rave
Attorney Jan. 31, 1961     H. C. LUTZ     2,969,885
CARRIERS OR TRAILERS
Filed Dec. 11, 1957     2 Sheets-Sheet 2
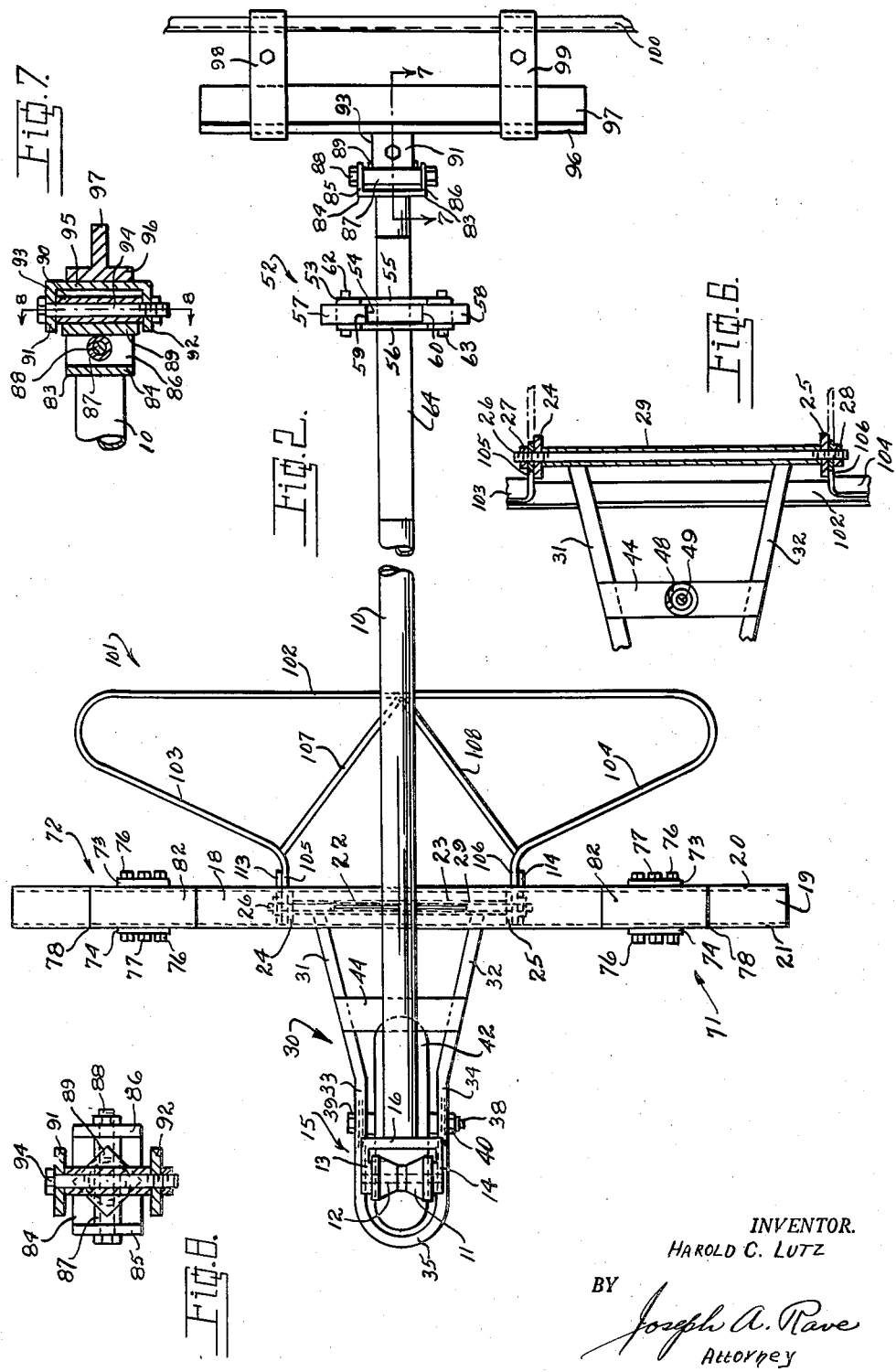
INVENTOR.
HAROLD C. LUTZ
BY
Joseph A. Rave
Attorney

United States Patent Office 2,969,885
Patented Jan. 31, 1961

2,969,885
CARRIERS OR TRAILERS
Harold C. Lutz, 720 Forest Lane, Covington, Ky., assignor of forty percent to Raymond R. Vincent, Dry Ridge, Ky.

Filed Dec. 11, 1957, Ser. No. 702,004
2 Claims. (Cl. 214—500)

This invention relates to improvements in carriers or trailers, particularly to a carrier or trailer for transporting the boat.

The principal object of the present invention is a provision of a boat carrier that is stable while being transported behind a vehicle such as the ordinary automobile.

Another object of this invention is the provision of a one wheel boat carrier or trailer but which is so designed with respect to balance that it has no sway or side movement while being transported.

A further object of this invention is the provision of a boat carrier or trailer that may be readily arranged as a stand for supporting the boat independently of its use in connection with its transporting vehicle.

It is also an object of this invention to provide a boat supporting carrier or trailer that is readily adjustable to boats of various and different sizes and is economical to produce and acquire.

Other objects and advantages of the present invention should be readily apparent by reference to the following specification considered in conjunction with the accompanying drawings forming a part thereof and it is to be understood that any modifications may be made in the exact structural details there shown and described, within the scope of the appended claims, without departing from or exceeding the spirit of the invention.

In the drawings:

Fig. 1 is a side elevational view of the boat carrier or trailer of the present invention.

Fig. 2 is a top plan view of the said trailer or boat carrier of Fig. 1.

Fig. 3 is a transverse sectional view of the boat trailer or carrier as seen from line 3—3 on Fig. 1.

Fig. 4 is an enlarged fragmentary sectional view through the supporting wheel mount of the carrier as seen from line 4—4 on Fig. 1.

Fig. 5 is an enlarged vertical sectional view through the boat support at one end thereof as seen from line 5—5 on Fig. 1.

Fig. 6 is an enlarged fragmentary view of certain parts of the supporting carriage or stand of the boat carrier or trailer as seen from line 6—6 on Fig. 1.

Fig. 7 is an enlarged sectional view through the attached end of the boat trailer or carrier and forming a detail of the invention as seen from line 7—7 on Fig. 2.

Fig. 8 is a transverse sectional view through certain parts of Fig. 7 as seen from line 8—8 on said Fig. 7.

Throughout the several views of the drawings similar reference characters are employed to denote the same or similar parts.

The boat carrier or trailer of the present invention comprises a longitudinal body member 10 preferably in the form of a pipe or tube and which extends for substantially the full length of the trailer or carrier.

Mounted at one end of the body member 10 is a grooved pulley or wheel 11 suitably journaled for free rotation through a shaft 12 carried by the arms 13 and 14 of a yoke indicated in its entirety by the reference numeral 15. The yoke 15 has its arms 13 and 14 joined or connected in spaced relation by a base member 16 from which projects a circular boss 17 disposed in the bore of the tubular body member 10 at one end thereof. The said yoke 15 is secured to the body member 10 by a transverse pin 18' extending through the said body member 10 and yoke boss 17 which prevents rotative movement of the yoke 15 relative to the body member.

Inwardly of the grooved wheel 11 the body member 10 is provided with a transverse member or beam 18. As seen in Figs. 1 and 3 said beam 18 conveniently takes the form of a channel iron having the body member 10 secured to the uper face of its web 19 and with said beam or channel 18 having its arms 20 and 21 depending below the body member 10. These parts are secured to one another through any desirable medium, preferably, by welding and to re-enforce said connection use is made of gusset plates 22 and 23 preferably triangular shaped as clearly shown in Fig. 3 and with said gusset plates each having its longer side secured, preferably by welding, to the web 19 of the beam or channel iron 18, and said gusset plates 22 and 23 each have their upstanding shorter sides secured to the body member 10, again, preferably by welding.

Secured to and depending from the transverse member or beam 18 are ears 24 and 25 with said ears equally spaced on the opposite sides of the longitudinal center of the body member 10. Supported by the said ears 24 and 25 is a rod 26 having its opposite ends threaded to receive nuts 27 and 28 whereby said rod is restrained against axial movement relative to its supporting ears 24 and 25 and the transverse member or beam 18. Disposed on said rod 26 between the ears 24 and 25 is a tube or sleeve 29 which may rotate or oscillate on said rod 26. The said sleeve 29 has extending from a point inwardly of each end thereof a frame indicated in its entirety by the reference numeral 30 and which frame comprises arm portions 31 and 32 converging on one another to a point whereupon said frame sides 31 and 32 project, respectively, as frame side portions 33 and 34 which are parallel with one another having their outer ends joined by an arcuate guard portion 35. The said frame constitutes or forms the support for the supporting wheel as will presently be described.

As seen in Fig. 1 said frame side portions 31 and 32 not only converge but also downwardly and rearwardly incline to the said frame side portions 33 and 34 which latter portions are arranged to be in a plane substantially parallel with the supporting surface. The said frame side portions 33 and 34 each has depending from a point intermediate its length a wing, respectively 36 and 37, having aligned apertures for an axle 38 illustrated in the drawings and conveniently taking the form of a bolt including a head 39 at one end and threads at its other end for the reception by a nut 40 and through which head 39 and nut 40 the axle bolt 38 is secured to the wings or hangers 36 and 37. Disposed on said axle-bolt 38 is a wheel 41 preferably in the form of a disc to which may be secured a resilient tire 42, such as the usual pneumatic tire although such a tire is not specifically illustrated in the drawings. It will be noted from Fig. 4 that the construction is such that the wheel 41 is mounted on anti-friction bearings 43 carried by the axle-bolt 38.

As intimated above the frame 30 and therefore the wheel 41—42 is mounted for oscillatory or rotary movement on the rod 26 but such a movement is limited and cushioned wherefore the boat on the carrier is given an "easy" ride. Any suitable or desirable means may be employed for the purpose of cushioning the frame 30, preferably, and that shown in the drawings, comprising a transverse brace plate 44 connecting the frame arm portions 31 and 32 at points just ahead of the wheel 41 and 42. Depending from the carrier body member or tube 10, at a point above said transverse brace 44, is a bracket comprising attaching portions or arms 45 and 46 between which is a body portion 47 which extends parallel with the brace plate 44 and therefore downwardly and rearwardly inclines with respect to the said carrier body member or tube 10. Extending between the supporting wheel frame transverse brace plate 44 and bracket body portion 47 is an expansion coil spring 48 which encircles a bolt 49 which has its head 50 located beneath the brace plate 44 and a nut 51 on its other and threaded end located above the bracket body portion 47. The parts are so related to one another that in normal operating positions the spring 48 is under compression and absorbs shocks incident to any roughness, projections, and the like, in the roadway surface during transportation of the carrier and its load.

Secured to the other or forward end of the carrier body member or tube 10 is a boat support indicated in its entirety by the reference numeral 52 and which comprises a substantially U-shaped carrier 53 including a base 54 and upstanding sides 55 and 56 the ends of which sides are in the form of upstanding ears between which are the boat support members 57 and 58. The boat support members 57 and 58 are, substantially, in the form of quadrants of resilient material, such as rubber. The said boat supports 57 and 58 are adapted to have their arcuate surfaces 59 and 60 actuated or adjusted relative to one another to vary the contour of a throat 61 between said arcuate surfaces 59 and 60. For the purposes of adjustment, and in order to secure said quadrants in their adjusted positions, the said quadrants are respectively eccentrically mounted on axle bolts 62 and 63 joining the carrier sides 55 and 56 to one another.

The said boat support 52 is adapted to be secured in adjusted longitudinal positions on the carrier body member or tube 10, and for which purpose the said carrier body member or tube 10 has secured to it for a distance rearwardly of its forward end, a channel iron 64 which has the outer surface of its base or web 65 upwardly and its arms 66 and 67 depending toward and into engagement with the outer surface of the carrier body member or tube 10. The said channel iron 64 is secured to the carrier body member or tube 10 by welding.

In operation the boat carrier 53 has the outer surface of its base 54 in contact with the upper surface of the channel base 65 and the said carrier base 54 has depending from it, on each side of the carrier body member or tube 10, bolts 68 and 69 which extend through projecting portions of a clamp strap 70.

Obviously by loosening the clamp bolts 68 and 69 the boat carrier 52 may be adjusted longitudinally of the carrier body member or tube 10 on the channel iron 64 and secured in any desirable adjusted position.

From the foregoing it will be noted that the transported boat will have one end resting in the groove of the grooved wheel 11 and have its other end disposed in the throat 61 between the quadrants 59 and 60. In order that the boat will not tilt in the cradle provided by said grooved wheel 11 and boat support 52 the transverse member or beam 18 is provided with means to engage the outer surface of the boat hull.

The said boat hull supporting means, one on each side of the carrier body member or tube 10, are, respectively, indicated in its entirety by the reference numerals 71 and 72 and since they are identical in construction a description of one will suffice for the other.

Accordingly, and as seen in Figs. 1 and 3, the boat hull supporting member 72 comprises a pair of side plates 73 and 74 each provided with a series of transversely aligned apertures 75 either of which series is adapted to be aligned with similar apertures in the depending arms 20 and 21 of the transverse brace or beam 18 for reception of bolts 76 which, therefore, secure the plates in desired vertical adjustable positions so that the upper ends of said plates 73 and 74 may be adjustably positioned upwardly of the upper surface of the base 19 of the beam 18. The upper ends of said plates 73 and 74 are provided, substantially centrally transversely thereof, with aligned apertures to receive a bolt 77 which simultaneously extends through aligned apertures in depending legs 78 and 79 of a short length of channel iron 80. The channel iron 80 has secured to the outer surface of its web 81 a soft or cushioning surface 82, and which may conveniently take the form of a piece of rubber sheeting.

As illustrated in Fig. 3 the channel iron 80, the boat hull support, per se, of each boat lateral support 71 and 72, may be tilted so as to conform to the upward transverse contour of the boat at the point of contact therewith and it will further be noted that each of the boat supports 71 and 72 may be vertically adjusted for again bringing the channel 80 into proper and effective supporting contact with the sides of the boat hull.

There is provided in connection with the boat carrier of the present invention a particular universal joint and which consists of a relatively short length of channel iron 83 having its web or base 84 welded to the end of the carrier body member or tube 10 and having disposed between its arms 85 and 86 a sleeve 87. The sleeve 87 has its central passageway aligned with apertures in the said arms 85 and 86 to receive a bolt 88 which has its head against one of the arms 85 and 86 and its nut against the other.

The sleeve 87 is welded to one face of a plate 89, see, particularly, Figs. 7 and 8, and which plate 89 has welded to its other face a second sleeve 90 similar in all respects to the sleeve 87 but with said sleeves 87 and 90 having their axes extending at right angles to one another.

The said second sleeve 90 is disposed, similar to sleeve 87, between the arms 91 and 92 of a second relatively short length piece of channel iron 93. The sleeve 90 has its central passageway aligned with apertures in the arms 91 and 92 of said channel member 93 and through which, again, extends a bolt 94 which has the head at one end thereof engaging the outer surface of one of said channel arms 91 and 92 and its nut engaging the other.

The said channel iron 93 has the outer surface of its base or web 95 welded to the outer surface, or the cross arm 96, of a length of T iron bar 97.

As seen in Fig. 2 the T iron bar 97 is of a length to extend beyond each side of the carrier body member or tube 10 and through which extensions the carrier is secured through suitable attaching clamps 98 and 99 to the bumper 100 of the moving vehicle, not shown. It will be understood that the clamps 98 and 99 may be secured to any other portion of the moving vehicle, if desired and as is customary and well known.

From the foregoing it is believed evident that there has been provided a boat carrier which is extremely simple to manufacture and yet adequately supports the boat at both ends and intermediate its ends.

It will further be noted that while the carrier will readily track behind a transporting vehicle there is no tendency for the trailer and its boat to deviate from the line in which it is being pulled, but the said boat carrier or trailer can be readily turned for rounding corners and for up and down grades in the road over which it is being transported.

It is frequently desired to detach the transporting vehicle from the trailer and allow the trailer to act as a stand for the boat. This situation is frequently encountered on the bank of the body of water on which the boat is to be used and which bank generally slopes into the water and in order to retain the present boat carrier or trailer in position on the bank means are provided for supporting the same as a stand.

As seen in Figs. 1, 2 and 3 the said stand comprises a framework, indicated in its entirety by the reference numeral 101, in the form of a squat triangle including a base 102 from the ends of which are converging arms 103 and 104. The inner ends of the arms 103 and 104 are bent to be substantially normal to the base 102 as arm portions 105 and 106 and parallel with one another and are spaced from one another sufficiently to engage the outer surfaces of the transverse member or beam depending ears or plates 24 and 25 and are pivoted on the ends of the bar 26 being retained in position by the nuts 27 and 28 at the threaded ends of said bar.

The brace, indicated in its entirety by the reference numeral 101, is provided with diverging struts 107 and 108 extending from substantially the mid-point of its base 102 to the arms 103 and 104 for securement thereto at approximately the points of connection with parallel arm portions 105 and 106.

The frame 101 being pivoted on the bar 26 is oscillated to a position to lie against the carrier body member or tube 10, as shown in phantom lines at 109, in Fig. 1, and to be retained in this position by latch 110 slidably mounted in latch housing 111 secured to and depending from the undersurface of said carrier body member or tube 10. Any suitable or desirable means may be employed for retracting the latch 110 such as the chain 112 secured to the rear end of the latch 110.

The stand 101 in its operative position extends at an angle downwardly and rearwardly of the carrier which would be in the direction of movement of the carrier by gravity when standing on the bank of the body of water, above referred to. This position of the stand is illustrated in Fig. 1 and in order to so position the said stand its parallel arm portions 105 and 106 have respectively secured to their outer surfaces stop bars or fingers 113 and 114 which engage with the transverse member or beam 18 as clearly illustrated in Fig. 1.

To support the end of the boat carrier normally attached to the transporting vehicle the said carrier body member or tube 10 has depending from said end thereof a skid stand 115 generally U shaped in elevation and including attaching fingers 116 and 117 through which said stand 115 is welded to the tube 10.

The boat carrier when in use as a support for the boat is detached from the mover and upon such detachment or release of the carrier, the trailer body member or tube 10 has its forward end lowered onto the said skid support 115. The boat carrier at this time, as will be obvious from Fig. 1, will have its central body portion or member 10 inclining downwardly and forwardly while the pivot stand 101 would be extending downwardly and rearwardly to a considerably greater extent than shown in Fig. 1, with the wheel 42 elevated above the ground surface and with the weight of the boat forwardly of the pivoted stand 101. By this construction and in view of the fact that the said pivoted stand extends transversely of the carrier to be beneath the lateral boat supports 71 and 72 a boat stand is provided that is safe against sliding and which requires the raising of the forward end of the said carrier or trailer to establish contact of the wheel 42 with the ground in order to permit it to be rolled into the body of water.

From the foregoing it is believed obvious that the boat carrier or trailer can be used as a stand and that in order to move the said boat trailer or carrier from its position as a stand it is necessary to raise the skid support end thereof to a point where the same is tilted on the axis of the wheel 41—42 to free the stand 101 and permit it to be swung forwardly on its mounting axis whereupon the boat carrier or trailer may be allowed to roll into the body of water on which it is to be used and floated free of the said carrier or trailer as is customary in launching boats of the type hereunder considered.

What is claimed is:

1. In a boat carrier of the class described comprising an elongated body member substantially the full length of the boat to be carried thereby, a rotatable boat support at the rear end of said body member, a cradle boat support at the forward end of said body member, an elongated transverse member carried by said body member with its lateral outer ends outwardly laterally of the body member, boat supports carried by said transverse member outwardly of the body member for engaging and supporting the boat intermediate its end supports, a wheel frame pivotally carried by the transverse member to extend rearwardly thereof below the rear end of the body member, a wheel rotatably supported by said wheel frame at a point substantially below the body member rear end and its rotatable boat support, a stand frame pivotally carried by said transverse member substantially coaxially with the wheel frame extending rearwardly and downwardly of the body member to a point just forwardly of the wheel, said stand frame including a base of a length to have its ends outwardly and substantially beneath the transverse member boat supports, said stand frame being adapted to be swung on its pivotal mounting to a position in a plane below the plane of the body member, means carried by said body member for releasably securing the stand frame in said last named position, and a depending support of less height than the pivoted stand frame adjacent the forward end of the body member cooperating with said stand frame for supporting said body member with its axis extending downwardly and forwardly and said pivoted stand extending downwardly and rearwardly preventing rearward movement of said body member.

2. In a boat carrier of the class described comprising an elongated body member substantially the full length of the boat to be carried thereby, a rotatable boat support at the rear end of said body member, a cradle boat support at the forward end of said body member, an elongated transverse member carried by said body member with its lateral outer ends outwardly laterally of the body member, boat supports carried by said transverse member outwardly of the body member for engaging and supporting the boat intermediate its end supports, a wheel frame pivotally carried by the transverse member to extend rearwardly thereof below the rear end of the body member, a wheel rotatably supported by said wheel frame at a point substantially below the body member rear end and its boat support, a stand frame pivotally carried by said transverse member substantially coaxially with the wheel frame, extending rearwardly and downwardly of the body member to a point just forwardly of the wheel, said stand frame including a base of a length to have its ends outwardly and substantially beneath the transverse member boat supports, said stand frame being adapted to be swung on its pivotal mounting to a position in a plane below the plane of the body member, means carried by said body member for releasably securing the stand frame in said last named position, a depending support of less height than the stand frame adjacent the forward end of the body member cooperating with the stand frame for supporting said body member with its axis extending downwardly and forwardly and said pivoted stand extending downwardly and rearwardly preventing rearward movement of said body member, and means carried by the forward end of the body member for attaching same to a mover including means for providing pivots whose axes extend at right angles to one another, means for securing one of said pivot providing means to said forward end of the body member, and means for securing said second pivot providing means to said mover.

References Cited in the file of this patent

UNITED STATES PATENTS

| | | |
|---|---|---|
| 1,226,687 | Mowry | May 22, 1917 |
| 2,225,157 | Court | Dec. 17, 1940 |
| 2,256,038 | Woodruff | Sept. 16, 1941 |
| 2,256,557 | Gustin | Sept. 23, 1941 |
| 2,466,938 | Evans et al. | Apr. 12, 1949 |
| 2,691,534 | Sampsell | Oct. 12, 1954 |
| 2,746,771 | Gross | May 22, 1956 |
| 2,766,897 | Alker | Oct. 16, 1956 |